United States Patent [19]

Hatanaka et al.

[11] Patent Number: 5,399,407
[45] Date of Patent: Mar. 21, 1995

[54] MAGNETIC RECORDING MEDIUM

[75] Inventors: Hideo Hatanaka, Neyagawa; Fumio Echigo, Osaka; Yoshio Enoki, Katano, all of Japan

[73] Assignee: Matsushita Electric Industrial Co., Ltd., Osaka, Japan

[21] Appl. No.: 38,194

[22] Filed: Mar. 26, 1993

Related U.S. Application Data

[63] Continuation of Ser. No. 892,701, May 29, 1992, abandoned, which is a continuation of Ser. No. 334,523, Apr. 7, 1989, abandoned.

[30] Foreign Application Priority Data

Apr. 11, 1988 [JP] Japan .................. 63-88713

[51] Int. Cl.⁶ .................. B32B 3/02; B32B 5/16; G11B 5/66
[52] U.S. Cl. .................. 428/64; 428/65; 428/323; 428/328; 428/329; 428/694 B; 428/694 BB; 428/694 BN
[58] Field of Search .......... 428/64, 65, 323, 328, 428/329, 900, 694 B, 694 BB, 694 BN

[56] References Cited

U.S. PATENT DOCUMENTS

| | | | |
|---|---|---|---|
| 4,327,188 | 4/1982 | Endo et al. | 501/134 |
| 4,407,901 | 10/1983 | Miyatsuka | 428/694 |
| 4,521,480 | 6/1985 | Fujiki | 428/694 |
| 4,551,386 | 11/1985 | Yamaguchi | 428/323 |
| 4,670,337 | 6/1987 | Tokuoka | 428/329 |
| 4,689,265 | 8/1987 | Miyoshi | 428/694 |
| 4,740,418 | 4/1988 | Kosha | 428/694 |
| 4,756,962 | 7/1988 | Takamatsu | 428/328 |
| 4,780,365 | 10/1988 | Kakuishi | 428/328 |
| 4,837,083 | 6/1989 | Kuroda | 428/694 |
| 4,917,947 | 4/1990 | Kosha | 428/329 |

FOREIGN PATENT DOCUMENTS

2609021A1 7/1988 France.
3707396A1 9/1988 Germany.
56-29840 3/1981 Japan.

OTHER PUBLICATIONS

*Japanese Journal of Applied Physics*, Supplements, vol. 24 Suppl. 24-3, 1985, Tokyo, Japan, pp. 13-16; H. Adachi et al.: "Preparation and properties of (Pb,La) T103 epitaxial thin films by multi-target sputtering", FIGS. 2, 3; table I.

*Journal of Applied Physics*, vol. 60, No. 8, Oct. 15, 1986, New York, U.S., pp. 2194-2919; Iijima et al: "Epitaxial growth and the crystallographic, dielectric and pyroelectric properties of lanthanum-modified lead titanate films" p. 2914, column 2, paragraph 2-p. 2915, paragraph 1; table I, p. 2915, col. 2, line 4-line 8.

*Applied Physics*, vol. 21, No. 4, Apr. 1989, Heidelberg DE, pp. 339-343, M. Okuyama et al.: "Epitaxial growth of ferroelectric PLZT thin films and their optical properties", p. 339, col. 2, paragraph 2-p. 340, col. 1, paragraph 2; table 2.

*Primary Examiner*—Paul J. Thibodeau
*Assistant Examiner*—Leszek Kiliman
*Attorney, Agent, or Firm*—Stevens, Davis, Miller & Mosher

[57] ABSTRACT

Of disk-shaped or tape-shaped magnetic recording media composed of non-magnetic supports and magnetic layers which, formed on the supports, contain a magnetic powder and a binder for it, the magnetic recording medium having superior electro-magnetic conversion characteristics, high durability, and high reliability has been obtained as a result of improving the abrasion resistance of the magnetic layer without impairing the surface smoothness thereof, by incorporating a non-magnetic inorganic powder of at least 5 Mohs hardness which has a dendrite or chain structure.

13 Claims, 5 Drawing Sheets

PARTS BY WT. OF $\alpha$-$Al_2O_3$ ADDED

FIG.4

$\overline{D}$ = AVERAGE PRIMARY-PARTICLE SIZE OF DENDRITE- OR CHAIN-SHAPED $\alpha$-$Al_2O_3$

MAGNETIC RECORDING MEDIUM

This application is a continuation of application Ser. No. 07/892,701, filed May 29, 1992, now abandoned which in turn is a continuation of application Ser. No. 07/334,523, filed Apr. 7, 1989, now abandoned.

BACKGROUND OF THE INVENTION

1. Field of the Invention

The present invention relates to a disk-shaped magnetic recording medium composed of a non-magnetic support and a magnetic layer which, formed on the support, contains a magnetic powder and a binder for it. The invention further relates to a tape-shaped magnetic recording medium composed of a non-magnetic support, a magnetic layer which, formed on a main part of one side of the support, comprises a magnetic powder and a binder for it, and a back coating layer which, formed on a main part of the other side of the support, comprises carbon black dispersed in a binder. Particularly, the invention is directed to disk-shaped or tape-shaped magnetic recording media superior in electro-magnetic conversion characteristics and in durability.

2. Description of the Prior Art

Various disk-shaped magnetic recording media including so-called floppy disks and hard disks have been put to practical use and in the field of these recording media it is advanced year after year to make the density of recording higher and the wavelength of recording signals shorter. This is also true in the field of tape-shaped magnetic recording media for use in audio and video equipment, computers, etc. In response to this, it has been contemplated, in respect to magnetic recording media of the coating type comprising a non-magnetic support overlaid with a magnetic layer which contains a magnetic powder and a binder, that the magnetic powder to be dispersed in the magnetic layer is made finer and packed more densely. As a result, the surfaces of such magnetic layers have become much smoother and electro-magnetic conversion characteristics, including output characteristics, of those recording media have been improved; that is widely known.

However, these surface-smoothed magnetic recording media, as compared with conventional ones, tend to be low in traveling endurance or in the abrasion resistance magnetic coating layers, because the magnetic layer-magnetic head contact area as well as the coefficient of friction of magnetic coating layer increase with the increasing smoothness of this layer. That is to say, the contact of the magnetic layer with the magnetic head causes magnetic particles to fall off from the magnetic layer and these magnetic particles stick on the magnetic head, blinding the gap of the head. This tends to bring about great difficulties or serious troubles in recording and in reproduction.

Measures against this are already proposed for the purpose of fortifying such magnetic coating layers and achieving proper cleaning effect on magnetic heads. The measures comprise incorporating a relatively hard non-magnetic powder, e.g. an $Al_2O_3$, $Cr_2O_3$, or $\alpha$-$Fe_2O_3$ powder, as an abrasive into the magnetic layer and, if necessary, using a solid or liquid lubricant jointly with the non-magnetic powder, as disclosed in documents, e.g. Japanese Patent Publication Nos. Sho. 57-49967 and Sho. 57-49969 and Japanese Patent Application Kokai Nos. Sho. 60-5421, Sho. 60-7614, and Sho. 61-73240.

Examples of U.S. Patents disclosing abrasives for magnetic tapes are as follows:

U.S. Pat. No. 4,275,115 (Jun. 23, 1981), two abrasives of at least 7 and less than 7 in Mohs hardness.

U.S. Pat. No. 4,399,189 (Aug. 16, 1983), ($Al_2O_3$ and/or $Cr_2O_3$)+($TiO_2$, . . . and/or $CeO_2$).

U.S. Pat. No. 4,423,452 (Dec. 27, 1983), $TiO_2$ ($>0.4\mu$)+other abrasives.

U.S. Pat. No. 4,460,651 (Jul. 17, 1984), $\alpha$-$Al_2O_3$ ($\leq 1\mu$) ($\alpha$-form content 60-90%).

U.S. Pat. No. 4,618,536 (Oct. 21, 1986), $\alpha$-$Fe_2O_3$, $Al_2O_3$, $Cr_2O_3$.

U.S. Pat. No. 4,748,081 (May 31, 1988), specific $\alpha$-$Fe_2O_3$.

U.S. Pat. No. 4,756,962 (Jul. 12, 1988), $\alpha$-$Al_2O_3$ (0.1–0.3$\mu$) ($\alpha$-form content $\geq 50\%$).

For reducing the coefficient of friction of tape-shaped magnetic recording media during travel and thereby improving the durability, there is already proposed a measure which comprises providing a back coating layer (hereinafter abbreviated as a back layer) containing a filler dispersed in a binder, on the side opposite to the magnetic layer side of a non-magnetic support. In many cases, such back layers are formed with the objects of improving magnetic recording media in antistatic properties and providing light shields, besides the above-mentioned objects, and carbon black is used as a filler in these back layers. The object of improving in antistatic properties is to inhibit electric charge generation on magnetic recording media and thereby lessen the adhesion of dust or dirt, which are responsible for "dropout". The object of providing light shields is to reduce the malfunction of a light sensor which is used when the initial end and final end of a magnetic recording tape can be detected with a change in the light transmittance of the tape.

For improving the abrasion resistance of the back layer containing carbon black, the same measures as in the case of the magnetic layer are already proposed that comprise incorporating a relatively hard non-magnetic powder, e.g. an $Al_2O_3$, $Cr_2O_3$, or $\alpha$-$Fe_2O_3$ powder, as an abrasive into back layers and, if necessary, using a solid or liquid lubricant additionally. An example of these measures: U.S. Pat. No. 4,741,954 (May 3, 1988), carbon black+non-magnetic powder (Mohs hardness $\geq 5$).

However, the above conventional abrasives incorporated into magnetic layers or back layers are generally in granular form and it is necessary for the coat reinforcement to use either larger granules of abrasive or a large amount of smaller granules of abrasive. In any case, requirements for magnetic recording media in respect to electro-magnetic conversion characteristics are difficult to satisfy with conventional granular abrasives. That is, low electro-magnetic conversion characteristics are caused by the low surface smoothness of magnetic layers when a large granular abrasive is used, and by the low magnetic powder content in magnetic layers when a smaller granular abrasive is used in a large amount. In the case of back layers, the surface smoothness thereof lowers as the particle size and amount of abrasive are increased. As a result, projections or depressions at the back layer surface, when the magnetic tape is wound up into a roll, are reproduced at the magnetic layer surface. Such phenomena are responsible for lowing in the electro-magnetic conversion characteristics of magnetic recording media.

Examples of the abrasives having shapes other than granular shapes are disclosed in Japanese Patent Application Kokai Nos. Sho. 57-162127 (acicular $\alpha$-$Fe_2O_3$), Sho. 58-68232 (fine flat powder), Sho. 61-220127 (acicular inorganic powder of more than 5 Mohs hardness), Sho. 61-283030 (granular $Al_2O_3$+angular $Al_2O_3$ particles), Sho. 62-92128 (acicular abrasive), and Sho. 62-219327 (powders of an oriented shape, plate shape, and needle shape are described as examples). The effect and problem of the addition of these abrasives are nearly the same as in the case of the above stated granular abrasives.

For reasons as stated above, it is strongly desired today to further improve magnetic recording media in electro-magnetic conversion characteristics and in durability at the same time.

SUMMARY OF THE INVENTION

Accordingly, it is an object of the present invention to provide novel disk-shaped or tape-shaped magnetic recording media of the so-called coating type which are improved in both electro-magnetic conversion characteristics and durability to solve the above noted problems.

To achieve the above and other objects, the disk-shaped or tape-shape magnetic recording medium composed of a non-magnetic support, a magnetic layer which, formed on a main part of one side of the support, contains a magnetic powder and a binder for it, and a back coating layer which, formed on a main part of the other side of the support, comprises carbon black dispersed in a binder, said medium being characterized in that the magnetic layer or both the magnetic layer and the back coating layer contain a non-magnetic powder having a Mohs hardness of at least 5 and a dendrite or chain structure.

The disk- or tape-shaped magnetic recording medium which is markedly improved in durability without impairing the electro-magnetic conversion characteristics is obtained because of providing characteristic particle shapes to the non-magnetic inorganic powder. That is, the non-magnetic powder used in the present invention consists of dendrite- or chain-shaped aggregates or agglomerates of two or three inorganic particles having an average primary-particle size of 0.1 to 0.6 $\mu$m (confirmed by electron microscopic observation). Hence, these particle aggregates, when incorporated into the coating, exhibit great reinforcing effects similar to those of large particles on the abrasion resistance of coating. On the other hand, since the present powder consists of aggregates of relatively small particles, the surface smoothness of coating is not much lowered and this results in good electro-magnetic conversion characteristics and markedly improved durability.

DETAILED DESCRIPTION OF PREFERRED EMBODIMENTS

Powders for use in the present invention which have Mohs hardness of at least 5 and consist of dendrite- or chain-shaped aggregates of two or three non-magnetic inorganic particles having an average primary-particle size of 0.1 to 0.6 $\mu$m can be obtained in the productions of $Al_2O_3$, $Cr_2O_3$, $\alpha$-$Fe_2O_3$, $TiO_2$, SiC, $SiO_2$, and $ZrO_2$ powders, for instance, by burning them at higher temperatures than in the ordinary methods. Needless to say, the powder production in the invention is not limited to these methods.

Of the inorganic powders mentioned above, $Al_2O_3$, $Cr_2O_3$, $\alpha$-$Fe_2O_3$, and $TiO_2$ powders are preferred in view of the coating reinforcing effect and the dispersibility in the binder.

Sufficient coating reinforcing effect cannot be obtained if the dendrite- or chain-shaped aggregates of two or three non-magnetic inorganic particles of at least 5 Mohs hardness used in the invention have a less average primary-particle size than 0.1 $\mu$m, that is, if the average size of primary particles prior to the aggregation is less than 0.1 $\mu$m, If the average primary-particle size exceeds 0.6 $\mu$m, coatings good in surface smoothness will be difficult to obtain, hence the deterioration of electro-magnetic conversion characteristics being inevitable.

The non-magnetic inorganic powder is used desirably in an amount of 3 to 15% by weight based on the magnetic powder. When the amount used is too small, the abrasion resistance of coating will not be improved. When the amount used is excessive, the surface smoothness of coating will be low and electro-magnetic conversion characteristics are deteriorated simultanesously with lowering in the smoothness.

The disk-shaped magnetic recording media of the invention can be produced generally according to known processes by applying a coating material composed of a magnetic powder, a binder, said non-magnetic powder characteristic of the invention, and further an antistatic agent, lubricant, and solvent on a non-magnetic support such as a polyester film, drying the applied coating material, and punching the coated support to give disk-shaped pieces.

Suitable magnetic powders for use herein are powders of magnetic oxides such as $\gamma$-$Fe_2O_3$, $Fe_3O_4$, Co-containing $\alpha$-$Fe_2O_3$, Co-containing $Fe_3O_4$, $CrO_2$, and barium ferrite and powders of magnetic metals or alloys such as Fe, Fe—Ni, and Fe—Co.

Inorganic powders, as defined above, having a dendrite- or chain structure may be used alone or in combination two or more or jointly with known granular powders, as mentioned before, having higher hardness (Mohs hardness: >5). But, it is necessary in this case, to use the inorganic powder with a dendrite or chain structure in an amount of at least 50% by weight of the total amount of hard inorganic powder used.

For the formation of the magnetic layer in the invention, the non-magnetic inorganic powder is used desirably in an amount of 2 to 10 parts by weight per 100 parts by weight of the magnetic layer. For the formation of the back layer, the amount of said non-magnetic inorganic powder is desired to be from 0.5 to 5.0 parts by weight per 100 parts by weight of the back layer. Said powder used in too small amounts does not improve the abrasion resistance of coating, while the powder used excessively raises problems such that the surface smoothness of coating is lowered and electro-magnetic conversion characteristics of the recording medium are deteriorated on account of the low content of magnetic powder in the magnetic layer, as in the case of the magnetic layer, and further such that an increase in the abrasion loss of magnetic head tends to result from an excessive increase in the surface hardness of coating and the recorder portions (e.g. the tape guide roll in VTR) which contact with the back layer in operation tend to be damaged.

The magnetic layer of the tape-shaped magnetic recording medium according to the invention can be formed generally by known processes such as one comprising applying a coating material composed of a magnetic powder, a binder, said non-magnetic powder characteristic of the invention, and further an antistatic agent, lubricant, and solvent on a non-magnetic support such as a polyester film, drying the applied coating material and simultaneously subjecting it to a magnetic field orientation treatment, then smoothing the coating surface by calendering, and hardening the coating. The back layer can be formed by applying a coating material for back layers that is composed of carbon black, a binder, said non-magnetic inorganic powder characteristic of the invention, and if necessary, a dispersant, lubricant, and solvent on the side opposite to the magnetic layer side of such a non-magnetic support as mentioned above, drying the applied coating material, and if necessary, subjecting the coating to surface smoothing treatment and/or hardening treatment.

The order of forming the magnetic layer and the back layer is not particularly restricted: these layers may be formed at the same time or either of them may be formed earlier. In the invention, there is no particular restriction on the sort of carbon black to be incorporated into the back layer: any sort of carbon black may be used that is satisfactory in electrical conductivity and in light shielding function. But, carbon black of 20 to 150 $\mu$m average particle size is preferable in that the dispersibility of carbon black, which is a non-magnetic powder used as a main component of the back layer, has a great influence on the surface smoothness of this coating layer. That is, when the particle size of carbon black used is too small, the dispersibility thereof is worse and hence a highly smooth surface of coating is difficult to obtain and the resulting back layer will be unfavorable in abrasion resistance and in the coefficient friction. On the other hand, when carbon black with a larger average particle size is used, the dispersion of carbon black is better but a highly smooth surface of coating is also difficult to obtain and the resulting magnetic recording medium will be unsatisfactory in electro-magnetic conversion characteristics.

The content of carbon black in the back layer according to the invention is desired to be from 30 to 70 parts by weight per 100 parts by weight of the back layer. When the carbon black content is less than 30 parts by weight, the effect of carbon black addition is little and the back layer tends to have an increased coefficient of friction and exhibit stickiness, particularly interlayer stickiness at temperatures above ambient and in addition, the antistatic property and light shielding property given to the coating layer are unsatisfactory. On the contrary, when the non-magnetic powder content in the back layer exceeds 70 parts by weight, the back layer exhibits undesirably low surface smoothness, abrasion resistance, and adhesive properties.

The binder used in the magnetic recording medium of the invention can be chosen from a wide variety of known binders including; combinations of isocyanate compounds with thermoplastic resins such as cellulosic resins, polyurethane resins, polyvinyl chloride resins, polyester resins, acrylic resins, and rubberous resins; and combinations of said thermoplastic resins with resins or compounds having radiation-responsive unsaturated bonds.

The antistatic agent used in the magnetic recording medium of the invention can be chosen properly from; carbonaceous powders such as carbon black, graphite powder, and graphitized carbon black; powders of metals such as silver, tin, aluminum, zinc, chorimium, and titanium; and powders of alloys of these metals, all the powders having proper particle sizes. Of these powders, preferred is carbon black.

Lubricants for use in the magnetic recording medium of the invention include; saturated or unsaturated higher fatty acids such as myristic acid, palmitic acid, stearic acid, behenic acid, and oleic acid; saturated or unsaturated fatty acid esters such as butyl stearate and oleyl oleate; dibasic acid diesters such as dibutyl phthalate, dioctyl phthalate, and dioleyl adipate; silicone oils, and fluorine-containing oils. These lubricants may be used alone or in combination two or more.

Suitable organic solvents for use in the magnetic coating material to produce the magnetic recording medium of the invention include methyl ethyl ketone, methyl isobutyl ketone, toluene, cyclohexanone, ethyl acetate, and butyl acetate.

Suitable materials for the non-magnetic support used in the magnetic recording medium of the invention include: polyesters such as polyethylene terephthalate and polybutylene terephthalate; polyolefins such as polyethylene and polypropylene; cellulose derivatives such as cellulose triacetate and cellulose diacetate; other organic macromolecular compounds such as polycarbonate, polyvinyl chloride, polyimides, and aromatic polyamides, and metals such as aluminum. In certain cases, supports formed of these materials before use are subjected to surface treatment for the purpose of enhancing the adhesive property of the support to the magnetic layer.

Various mixers may be used for milling and dispersing the magnetic coating materials. Examples of such mixers are a roll mill, kneader, attritor, double planetary mixer, high-speed mixer, high-speed stone mill, agitator mill, sand mill, pin mill, ball mill, pebble mill, high-speed stirrer, and ultrasonic dispersion equipment, which are usable alone or in combination.

The present invention is illustrated in more detail with reference to the following examples of floppy disks. In these examples, parts of components are all by weight.

EXAMPLE 1

A dispersion was prepared by milling the following composition in a press kneader and further in a sand mill.

| Composition: | |
|---|---|
| γ-Fe₂O₃ coated with ferromagnetic Co | 100 parts |
| ⎡ Longer axial length ≈ 0.60 μm ⎤ ⎢ Shorter axial length ≈ 0.08 μm ⎥ ⎣ Hc = 720 Oe ⎦ | |
| Nitrocellulose resin | 12 parts |
| Polyurethane resin | 10 parts |
| Dendrite- or chain-shaped α-Al₂O₃ (a) | 7 parts |
| (average primary-particle size ≈ 0.3 μm) | |
| Carbon black | 10 parts |
| Organic solvent mixture | 300 parts |
| (Methyl ketone (MEK)/toluene/cyclohexanone = 3:2:1) | |

The dispersion, mixed with the following lubricants, was stirred with a high-speed agitator.

| Lubricant: | |
|---|---|
| Oleic acid | 1 part |
| Stearic acid | 1 part |
| Butyl stearate | 2 parts |
| Oleyl oleate | 2 parts |
| Dioleyl adipate | 2 parts |

Further, 5 parts of a polyisocyanate compound (supplied by Nippon Polyurethane Industry Co., Ltd. under the tradename of Coronate L) was admixed with the above mixture. The resulting blend was filtered through a filter of 1-μm mean pore size to make up a magnetic coating material.

Figure 1:
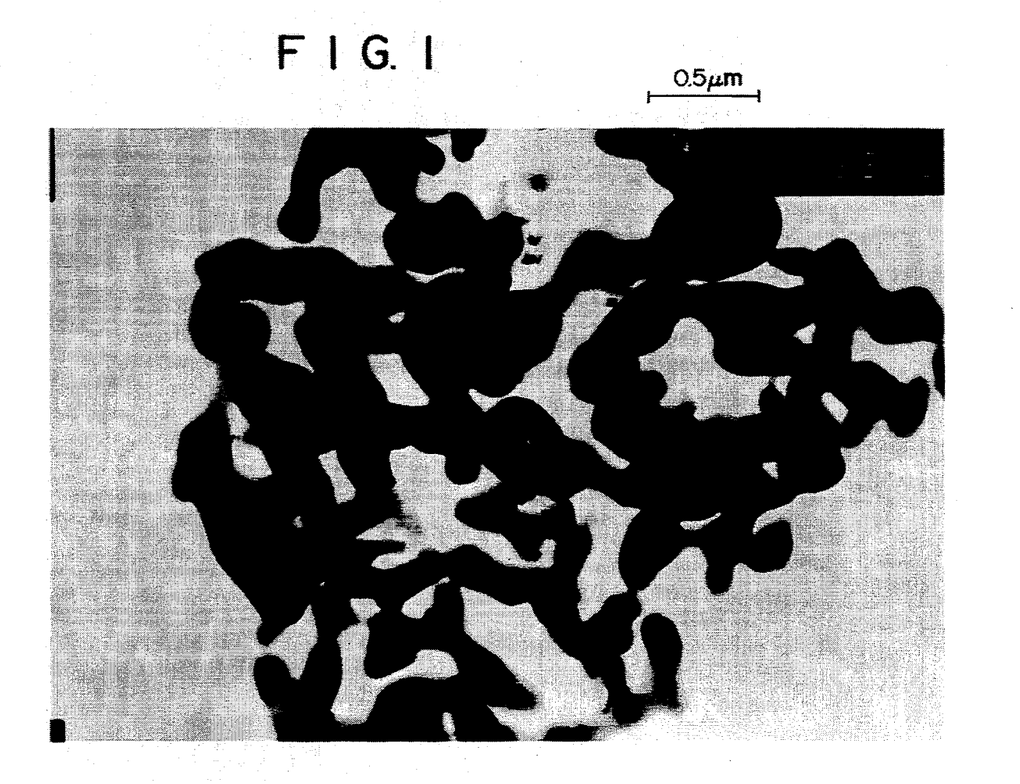
FIG. 1 is a photograph taken through a transmission type of electron microscope, of an $\alpha$-Al$_2$O$_3$ powder (2) used in Example 1.

This magnetic coating material was applied on both sides of a polyester base film (75 μm thick) which was previously treated for easy adhesion. The applied coating material was subjected to a random magnetic field orientation treatment and then dried. The coated polyester film was mirror-finished by means of a supercalender to give a stock roll of polyester film having a 1-μm thick magnetic layer on either side. After heat treatment, this coated polyester film was punched to give disks of 3.5 inch diameter, the magnetic layer surfaces of which were then polished, thus making up floppy disk samples. FIG. 1 is a photomicrograph (taken through a transmission-type electron microscope) of dendrite-shaped α-A₂O₃ (a) used in this example.

COMPARATIVE EXAMPLE 1

A magnetic coating material and then floppy disk samples were prepared according to the procedure of Example 1 but using 7 parts of granular α-Al₂O₃ (average primary-particle size ≈ 0.7 μm) in place of 7 parts of the dendrite- or chain-shaped α-Al₂O₃ (a).

COMPARATIVE EXAMPLE 2

A magnetic coating material and floppy disk samples were prepared according to the procedure of Example 1 but using 7 parts of granular α-Al₂O₃ (a) (average primary-particle size ≈ 0.3 μm) in place of 7 parts of the dendrite- or chain-shaped α-Al₂O₃ (a).

COMPARATIVE EXAMPLE 3

A magnetic coating material and floppy disk samples were prepared according to the procedure of Example 1 but using 12 parts of granular α-Al₂O₃ (average primary-particle size ≈ 0.3 μm) in place of 7 parts of the dendrite- or chain-shaped α-Al₂O₃ (a).

EXAMPLE 2

A dispersion was prepared by milling the following composition in a press kneader and further in a sand mill.

| Composition: | |
|---|---|
| γ-Fe₂O₃ coated with ferromagnetic Co | 100 parts |
| ⎡ Longer axial length ≈ 0.5 μm ⎤ ⎢ Shorter axial length ≈ 0.05 μm ⎥ ⎣ Hc = 730 Oe ⎦ | |
| Hydroxy-containing vinyl chloride-vinyl acetate copolymer resin | 12 parts |
| Polyurethane resin | 10 parts |
| Dendrite- or chain-shaped α-Al₂O₃ (b) | 4 parts |
| (average primary-particle size ≈ 0.5 μm) | |
| Carbon black | 10 prts |
| Organic solvent mixture | 300 parts |
| (MEK/toluene/cyclohexanone = 3:2:1) | |

The dispersion, mixed with the following lubricants, was stirred with a high-speed agitator.

| Lubricants: | |
|---|---|
| Oleic acid | 1 part |
| Butyl stearate | 2 parts |
| Oleyl oleate | 3 parts |
| Dioleyl adipate | 2 parts |

Figure 2:
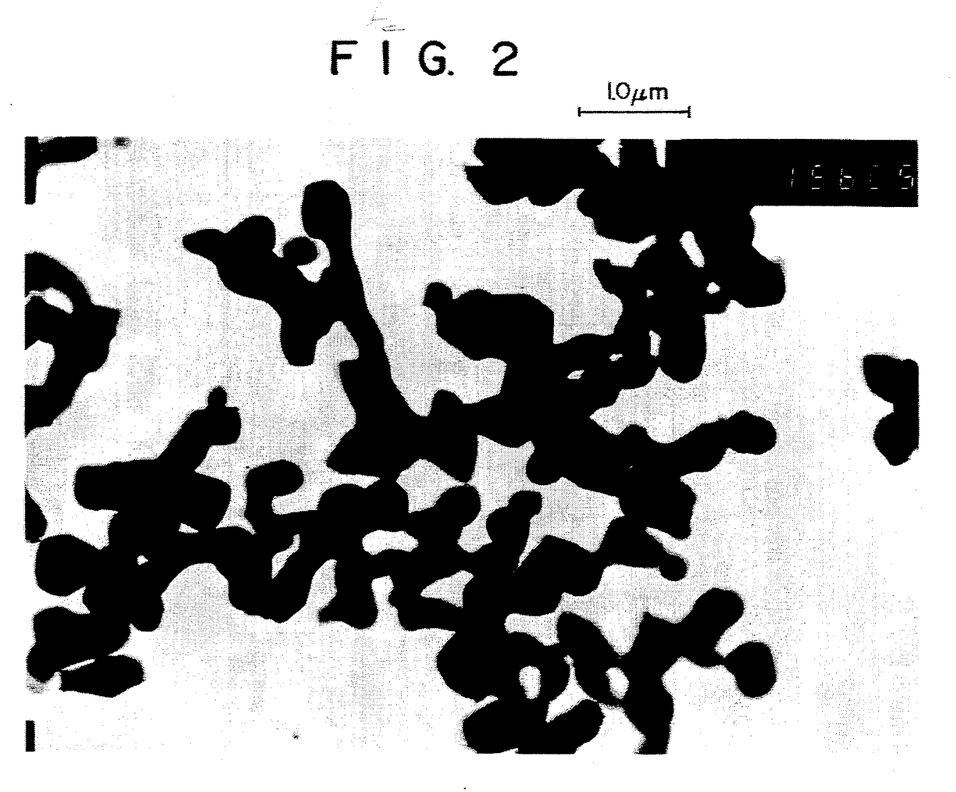
FIG. 2 is a similar electron photomicrograph of an $\alpha$-Al$_2$O$_3$ powder (b) used in Example 2.
Figure 3:
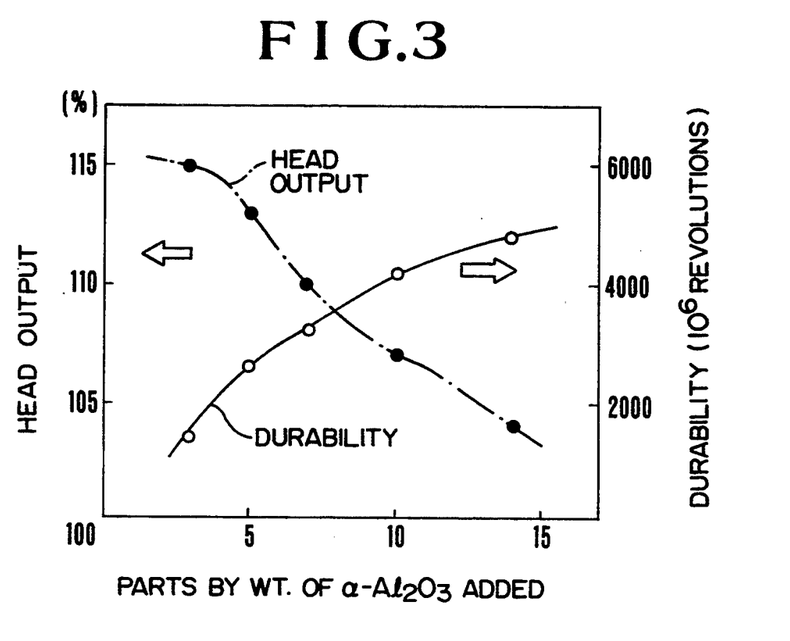
FIG. 3 is a graph showing the changes of head output and recording medium durability with the amount of dendrite- or chain-shaped $\alpha$-Al$_2$O$_3$ (a) added in Example 1.
Figure 4:
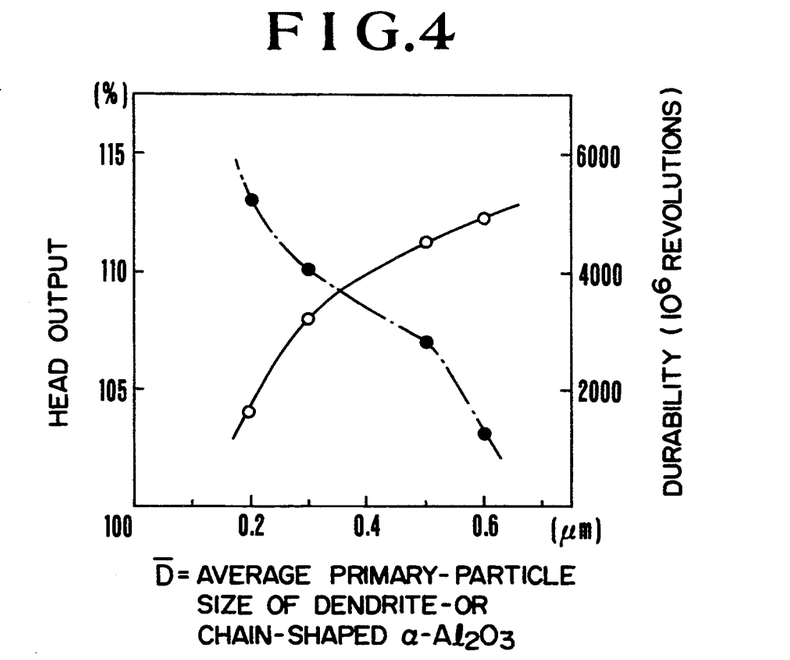
FIG. 4 is a graph showing the changes of head output and recording medium durability with the average primary-particle size (before particle agglomeration) of said $\alpha$-Al$_2$O$_3$ (a) added in Example 1.
Figure 5:
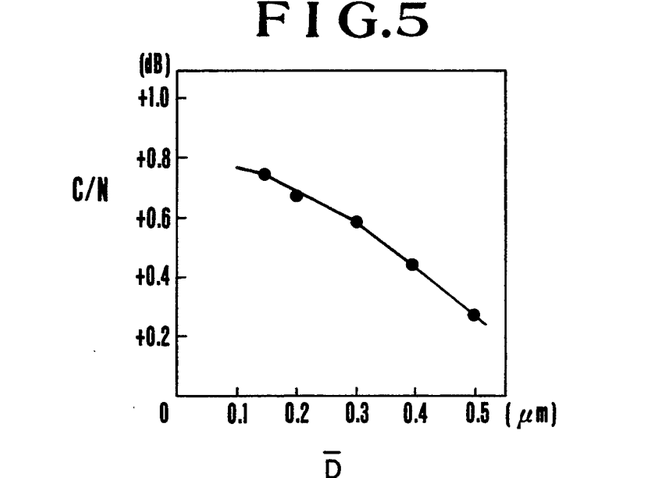
FIG. 5 is a graph showing the change of C/N with the average primary-particle size of said $\alpha$-Al$_2$O$_3$ (a) incorporated into the magnetic layer in Example 4-1.
Figure 6:
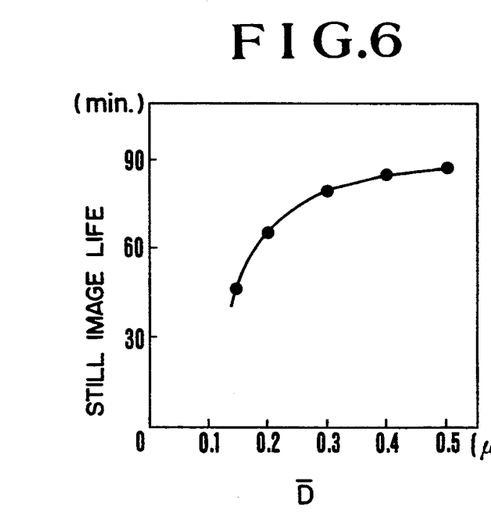
FIG. 6 is a graph showing the change of still life with the average primary-particle size of said $\alpha$-Al$_2$O$_3$ (a) incorporated into the magnetic layer in Example 4-1.
Figure 7:
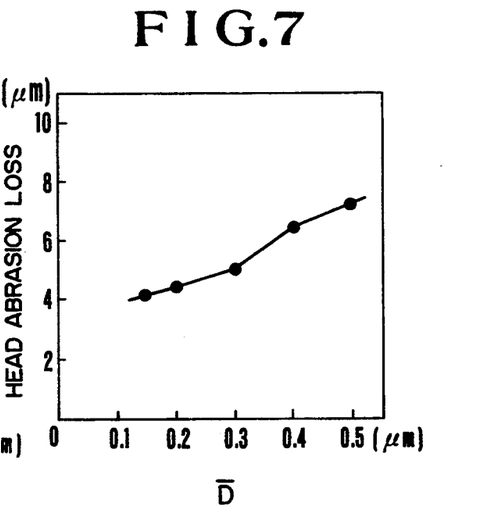
FIG. 7 is a graph showing the change of head abrasion loss with the average primary-particle size of said $\alpha$-Al$_2$O$_3$ (a) incorporated into the magnetic layer in Example 4-1.
Figure 8:
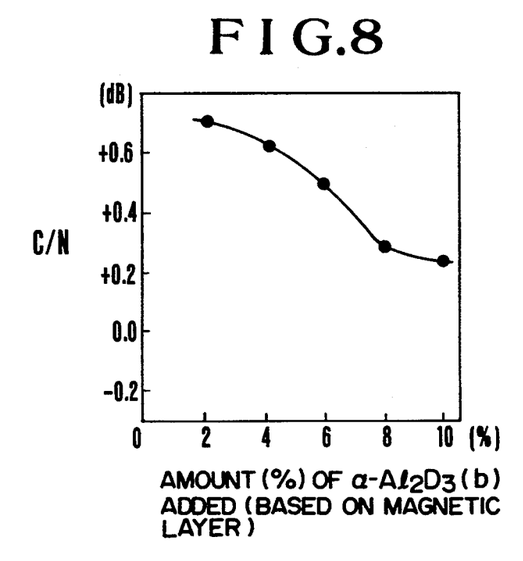
FIG. 8 is a graph showing the change of C/N with the amount of said $\alpha$-Al$_2$O$_3$ (b) incorporated into the magnetic layer in Example 4-2.
Figure 9:
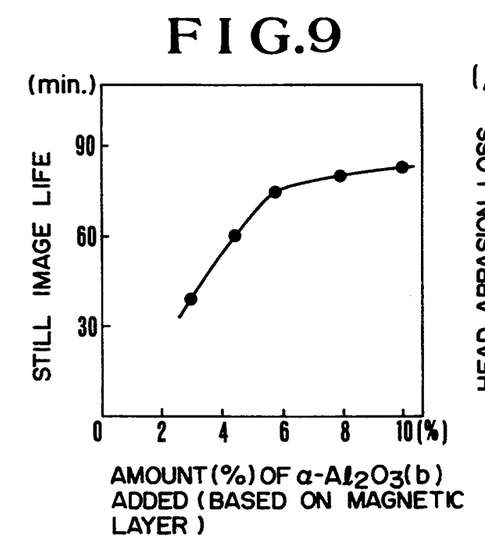
FIG. 9 is a graph showing the change of still life with the amount of said $\alpha$-Al$_2$O$_3$ (b) incorporated into the magnetic layer in Example 4-2.
Figure 10:
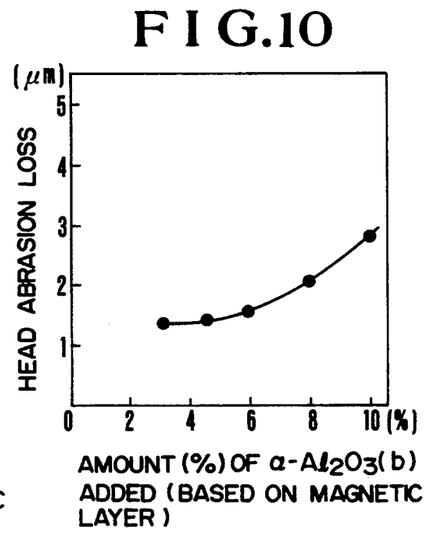
FIG. 10 is a graph showing the change of head abrasion loss with the amount of said α-Al₂O₃ (b) incorporated into the magnetic layer in Example 2-1.

Further, 5 parts of a polyisocyanate compound (coronate-L) was admixed with the above mixture. The resulting blend was filtered through a filter of 1-μm pore size to make up a magnetic coating material. Thereafter, the procedure of Example 1 was followed to prepare floppy disk samples. FIG. 2 is a photomicrograph (taken through a transmission-type electron microscope) of dendrite-shaped α-Al₂O₃ (b) used in this example.

COMPARATIVE EXAMPLE 4

A magnetic coating material and floppy disk samples were prepared according to the procedure of Example 2 but using 4 parts of granular α-Al₂O₃ (average primary-particle size ≈ 1.0 μm) in place of 4 parts of the dendrite- or chain-shaped α-Al₂O₃ (b).

EXAMPLE 3

A magnetic coating material and floppy disk samples were prepared according to the procedure of Example 1 but using 7 parts of dendrite- or chain-shaped Cr₂O₃ (average primary-particle size ≈ 0.4 μm) in place of 7 parts of the dendrite- or chain-shaped α-Al₂O₃ (a).

COMPARATIVE EXAMPLE 5

A magnetic coating material and floppy disk samples were prepared according to the procedure of Example 3 but using 7 parts of granular Cr₂O₃ (average primary-particle size ≈ 0.6 μm) in place of 7 parts of the dendrite- or chain-shaped Cr₂O₃.

The following evaluation tests were made on samples of different magnetic recording media (floppy disks) obtained in the foregoing examples.

(1) Surface Roughness (μm) of Magnetic Layer

This surface roughness was measured by using a stylus-type surface roughness meter (TALYSTEP-1 ®, supplied by Rank Taylor Hobson, Ltd.). The roughness value was expressed in terms of the calculated square root of the mean of the squares of peak heights which were found in a roughness chart obtained (reference: National Technical Report, Vol. 28, No. 3, p. 520 (June, 1982)).

(2) Head Output (%)

The head output was determined in accordance with the JIS test method for 3.5-inch micro-floppy disks, that is, a 2 F signal was recorded on track 79 of the sample disk by using a standard testing instrument and the average output during the reproduction of the recorded signal was measured with an AC electron voltmeter. The found output was expressed in terms of the value relative (percentage) to the average output measured on a standard disk in the same manner.

(3) S/N (dB)

About the ratio S/N, the average output (S) of 2 F signal from track 79 on the sample disk was determined according to the procedure of the above test (2) and the noise level (N) after DC erasing was determined by using the AC electron voltmeter, therefrom the ratio S/N being calculated.

(4) Durability

Using the standard testing instrument used in the above test (2), the sample disk with a head load of 15 g applied on a track of its own was revolved continuously under the cyclic conditions of 45° C. (80% RH)–5° C. (20% RH) (24 hours/cycle). In this case, the number of disk revolution was counted until the output from the disk decreased to 80% of the initial output. The durability was expressed in this found number of revolutions (it is desirable that this durability of commercial floppy disks be at least $10 \times 10^6$ revolutions).

Results of these evaluation tests are shown in the following table.

|  | Example | | | Comparative Example | | | | |
|---|---|---|---|---|---|---|---|---|
|  | 1 | 2 | 3 | 1 | 2 | 3 | 4 | 5 |
| (1) Surface roughness of magnetic layer (μm) | 0.028 | 0.031 | 0.030 | 0.036 | 0.026 | 0.036 | 0.041 | 0.031 |
| (2) Head output (%) | 110 | 108 | 108 | 94 | 108 | 94 | 90 | 105 |
| (3) S/N (dB) | 36 | 35 | 34 | 28 | 36 | 30 | 26 | 32 |
| (4) Durability ($1 \times 10^6$ revolutions) | ≧20 | ≧20 | ≧20 | 12 | 8 | 14 | ≧20 | 9 |

The present invention is further illustrated in detail with reference of the following examples of video tapes. In these examples also, parts of components are all by weight.

EXAMPLE 4-1

Preparation of Coating Material (M1—1) for Magnetic Layer

A dispersion was prepared by milling the following composition in a press kneader and further in a sand mill.

| Composition: | |
|---|---|
| $\gamma$-Fe$_2$O$_3$ containing ferromagnetic Co | 100 parts |
|   BET specific surface area = 38 m$^2$/g | |
|   Hc = 650 Oe | |
|   $\sigma$S = 78 emu/g | |
| Polyurethane resin | 10 parts |
| Hydroxy-containing vinyl chloride-vinyl acetate copolymer resin | 10 parts |
| Dendrite- or chain-shaped $\alpha$-Al$_2$O$_3$ (a) (average primary-particle size = 0.3 μm) | 4 parts |
| Carbon black (average primary-particle size = 50 mμ) | 4 parts |
| Myristic acid | 1 part |
| Butyl stearate | 1 part |
| Organic solvent mixture (MEK/toluene/cyclohexanone = 2:2:1) | 300 parts |

Then, 6 parts of a polyisocyanate compound (Coronate-L, supplied by Nippon Polyurethane Industry Co., Ltd.) was admixed with the dispersion. The resulting blend was filtered through a filter of 1-μm mean pore size to make up the intended coating material (M1—1) for magnetic layer use.

Preparation of Coating Material (B1—1) for Back Layer

A dispersion was prepared by ball-milling the following composition:

| | |
|---|---|
| Carbon black (average primary-particle size = 40 mμ) | 59 parts |
| Dendrite- or chain-shaped $\alpha$-Al$_2$O$_3$ (a) (average primary-particle size = 0.30 μm) | 1 part |
| Polyurethane resin | 20 parts |
| Nitrocellulose resin | 20 parts |
| Organic solvent mixture (MEK/toluene/cyclohexanone = 2:2:1) | 400 parts |

After addition of 10 parts of a polyisocyanate compound (Coronate-L), the dispersion was stirred with a high-speed agitator and then filtered through a filter of 3-μm mean pore size to make up the intended coating material (B1—1) for back layer use.

Subsequently, the coating material (M1—1) was applied on a 15-μm thick polyester film, and the applied coating material was subjected to a magnetic field orientation treatment and then dried. The dried coating was mirror-finished by means of a supercalender and then heat-treated to give a stock roll of polyester film having a 4.5-μm thick magnetic layer on one side. The coating material (B1—1) was then applied on the side opposite to the magnetic layer, of the polyester film, dried, and heat-treated to form a 0.8-μm thick back layer. The thus coated film was slit to give ½-inch wide video tapes (250 m long).

EXAMPLE 4-2

Video tape samples were made according to the procedure of Example 4-1 except that a coating material (M1—1) for the magnetic layer was prepared by using 3 parts of dendrite- or chain-shaped $\alpha$-Al$_2$O$_3$ (a) and 1 part of granular $\alpha$-Al$_2$O$_3$ (x) (average primary-particle size- 0.3 μm) in place of 4 parts of the dendrite- or chain-shaped $\alpha$-Al$_2$O$_3$ (a).

EXAMPLE 4-3

Video tape samples were made according to the procedure of Example 4-1 except that a coating material (M1-3) for the magnetic layer was prepared by using 7 parts of similar dendrite- or chain-shaped $\alpha$-Al$_2$O$_3$ (b) (average primary-particle size=0.15 $\mu$m) in place of 4 parts of the dendrite- or chain-shaped $\alpha$-Al$_2$O$_3$ (a).

COMPARATIVE EXAMPLE 6-1

Video tape samples were made according to the procedure of Example 4-1 except that a coating material (M1—1) for the magnetic layer was prepared by using 4 parts of granular $\alpha$-Al$_2$O$_3$ (y) (average primary-particle size=0.5 $\mu$m) in place of 4 parts of the dendrite- or chain-shaped $\alpha$-Al$_2$O$_3$ (a).

COMPARATIVE EXAMPLE 6-2

Video tape samples were made according to the procedure of Example 4-1 except that a coating material (M1-2) for the magnetic layer was prepared by using 4 parts of granular $\alpha$-Al$_2$O$_3$ (x) (average primary-particle size=0.3 $\mu$m) in place of 4 parts of the dendrite- or chain-shaped $\alpha$-Al$_2$O$_3$ (a).

COMPARATIVE EXAMPLE 6-3

Video tape samples were made according to the procedure of Example 4-1 except that a coating material (M1-3) for the magnetic layer was prepared by using 10 parts of granular $\alpha$-Al$_2$O$_x$ (x) (average primary-particle size=0.3 $\mu$m) in place of 4 parts of the dendrite- or chain-shaped $\alpha$-Al$_2$O$_3$ (a).

COMPARATIVE EXAMPLE 6-4

Video tape samples were made according to the procedure of Example 4-1 except that a coating material (B1—1) for the back layer was prepared by using no dendrite- or chain-shaped $\alpha$-Al$_2$O$_3$.

EXAMPLE 5-1

Preparation of Coating Material (M2-1) for Magnetic Layer

A dispersion was prepared by milling the following composition in a press kneader and further in a sand mill.

| | |
|---|---|
| Ferromagnetic Fe—Ni alloy | 100 parts |
| ⎡ Fe:Ni ratio = 98:2 ⎤ | |
| ⎢ BET specific surface area = 58 m$^2$/g ⎥ | |
| ⎢ Hc = 1450 Oe ⎥ | |
| ⎣ $\sigma$s = 125 emu/g ⎦ | |
| Polyurethane resin | 10 parts |
| Hydroxy-containing vinyl chloride-vinyl acetate copolymer resin | 10 parts |
| Dendrite- or chain-shaped $\alpha$-Al$_2$O$_3$ (b) (average primary-particle size = 0.5 $\mu$m) | 8 parts |
| Carbon black (average primary-particle size = 50 m$\mu$) | 1 part |
| Stearic acid | 1 part |
| Pentyl stearate | 1 part |
| Organic solvent mixture (MEK/toluene/cyclohexanone = 3:2:1) | 280 parts |

Then, 6 parts of a polyisocyanate compound (Coronate-L) was admixed with the dispersion and the resulting blend was filtered through a filter of 1-$\mu$m mean pore size to make up the intended coating material (M2-1) for magnetic layer use.

Preparation of Coating Material (B2-1) for Black Layer

A dispersion was prepared by ball-milling the following composition:

| | |
|---|---|
| Carbon black (average primary-particle size = 23 m$\mu$) | 40 parts |
| Dendrite- or chain-shaped $\alpha$-Al$_2$O$_3$ (b) (average primary-particle size = 0.15 $\mu$m) | 3 parts |
| Polyurethane resin | 25 parts |
| Nitrocellulose resin | 32 parts |
| Organic solvent mixture (MEK/toluene/cyclohexanone = 2:2:1) | 400 parts |

After addition of 10 parts of a polyisocyanate compound (Coronate-L), the dispersion was stirred with a high-speed agitator and then filtered through a filter of 3-$\mu$m mean pore size to make up the intended coating material (B2-1) for back layer use.

Subsequently, the coating material (M2-1) was applied on a 10-$\mu$m thick polyester film, and the applied coating material was subjected to a magnetic field orientation treatment and then dried. The dried coating was mirror-finished by means of a supercalender and then heat-treated to give a stock roll of polyester film having a 3.0-$\mu$m thick magnetic layer on one side. The coating material (B2-1) was then applied on the side opposite to the magnetic layer, of the polyester film, dried, and heat-treated to form a 0.6-$\mu$m thick back layer. The thus coated film was slit to give 8-mm wide video tape samples (80 m long).

COMPARATIVE EXAMPLE 7-1

Video tape samples were made according to the procedure of Example 5-1 except that a coating material (M2-1) for the magnetic layer was prepared by using 8 parts of granular $\alpha$-Al$_2$O$_3$ (x) (average primary-particle size=0.3 $\mu$m) in place of 8 parts of the dendrite- or chain-shaped $\alpha$-Al$_2$O$_3$ (b).

COMPARATIVE EXAMPLE 7-2

Video tape samples were made according to the procedure of Example 5-1 except that a coating material (M2—2) for the magnetic layer was prepared by using 12 parts of granular $\alpha$-Al$_2$O$_3$ (z) (average primary-particle size=0.15 $\mu$m) in place of 8 parts of the dendrite- or chain-shaped $\alpha$-Al$_2$O$_3$ (b).

The following evaluation tests were made on different video tape samples obtained in the foregoing Examples and Comparative Examples.

(1) Surface Roughness ($\mu$m)

The surface roughness of magnetic layer and that of back layer were measured by using a stylus-type surface roughness meter (TALYSTEP-1 ®, supplied by Rank Tayor Hobson Ltd.). The roughness value was expressed in terms of the calculated square root of the mean of the squares of peak heights which were found in the roughness chart obtained (reference: National Technical Report, Vol. 28, No. 3, p. 520 (June, 1982)).

(2) C/N (dB)

Each sample tape was half wound in a cassette, and the C/N at 4 MHz (Example 4-1 through Comparative Example 6-4) and the C/N at 5 MHz (Example 5-1 through Comparative Example 7-2) were determined by using a VHS-system VTR and an 8-mm VTR, respectively. The found ratios C/N were expressed in terms of the values relative to that ratio C/N of a standared tape which was assumed to be 0 dB.

(3) Still Image Life (Minute)

Using the same type of VTR as used in the evaluation test (2), a still image was reproduced from each sample tape at a surrounding temperature of −5° C. and the time (minute) for the reporoduction output to reduce −5 dB from the initial level was evaluated.

(4) Head Abrasion Loss (μm)

Using the same type of VTR as used in the evaluation test (2), each sample tape was subjected 100 times to reproduction traveling under the environmental conditions of 40° C. and 80% RH, and the video head of VTR was observed through an interference microscope, thereby measuring the head abrasion loss.

(5) Traveling Endurance of Tape

After the evaluation test (4) (repeating reproduction test) had been ended, each sample tape was visually observed to examine the roll appearance thereof and the degree of damage (various injuries) inflicted on both sides thereof.

The following table shows results of these evaluation tests on sample tapes obtained.

|  | (1) Surface roughness (μm) | | (2) | (3) Still image life (min.) | (4) Head abrasion loss (μm) | (5) |
|---|---|---|---|---|---|---|
|  | Magentic layer | Back layer | C/N (dB) |  |  | Traveling endurance of tape |
| ½-inch Video tape |  |  |  |  |  |  |
| Example 4-1 | 0.017 | 0.062 | +0.6 | ≧60 | 5.0 | Good |
| Example 4-2 | 0.015 | 0.058 | +0.7 | 50 | 4.5 | Nearly good |
| Example 4-3 | 0.016 | 0.061 | +0.6 | 50 | 5.0 | Good |
| Comparative Example 6-1 | 0.024 | 0.064 | −0.5 | ≧60 | 7.5 | Good |
| Comparative Example 6-2 | 0.013 | 0.058 | +0.8 | 15 | 4.0 | Scratches developed on magnetic layer |
| Comparative Example 6-3 | 0.019 | 0.058 | −0.6 | 50 | 6.5 | Good |
| Comparative Example 6-4 | 0.016 | 0.051 | +0.6 | ≧60 | 5.5 | Irregular tape winding, Remarkable flaws on back layer |
| 8-mm Video tape |  |  |  |  |  |  |
| Example 5-1 | 0.010 | 0.036 | +0.5 | ≧60 | 1.5 | Good |
| Example 5-2 | 0.011 | 0.037 | +0.3 | ≧60 | 1.8 | Good |
| Comparative Example 7-1 | 0.012 | 0.038 | −0.4 | ≧60 | 3.5 | Good |
| Comparative Example 7-2 | 0.012 | 0.036 | −0.3 | 20 | 3.0 | Nearly good |
| Comparative Example 7-3 | 0.013 | 0.038 | −0.4 | 40 | 2.5 | Scratches developed on magnetic layer |

As described hereinbefore, magnetic recording media improved in durability including the abrasion resistance of coatings and the still image life without impairing the surface smoothness of coatings can be obtained according to the present invention by incorporating into the magnetic layer or into both the magnetic layer and the back layer a non-magnetic inorganic powder which has a Mohs hardness of at least 5 and a dendrite or chain structure.

What is claimed is:

1. A disk-shaped magnetic recording medium composed of a non-magnetic support and a magnetic layer which, formed on the support, comprises a magnetic powder and a binder for the magnetic powder, a non-magnetic inorganic powder having a Mohs hardness of at least 5 and a dendrite or chain structure comprising aggregates or agglomerates of two or three granular particles having an average primary particle size of 0.11 to 0.6 μm.

2. The magnetic recording medium of claim 1, wherein the powder having a dendrite or chain structure is of $Al_2O_3$.

3. The magnetic recording medium of claim 1, wherein the powder having a dendrite or chain structure is of $Cr_2O_3$.

4. The magnetic recording medium of claim 1, wherein the powder having a dendrite or chain structure is of $\alpha\text{-}Fe_2O_3$.

5. The magnetic recording medium of claim 1, wherein the powder having a dendrite or chain structure is of $TiO_2$.

6. A magnetic recording medium of claim 1, wherein the non-magnetic inorganic powder is present in an amount of 3 to 15% by weight based on the magnetic powder.

7. A magnetic recording medium comprising a magnetic layer which, formed on one side of a support, contains a magnetic powder and a binder for the magnetic powder and a non-magnetic inorganic powder, and a back coating layer which, formed on the other side of the support, contains carbon black dispersed in a binder, said medium being characterized in that the magnetic layer alone or both the magnetic layer and back coating layer contains a non-magnetic inorganic powder having a Mohs hardness of at least 5 and dendrite or chain structure comprising aggregates or agglomerates of two or three granular particles having an average primary particle size of 0.1 to 0.6 μm.

8. The magnetic recording medium of claim 7, wherein the powder having a dendrite or chain structure is of $Al_2O_3$.

9. The magnetic recording medium of claim 7, wherein the powder having a dendrite or chain structure is of $Cr_2O_3$.

10. The magnetic recording medium of claim 7, wherein the powder having a dendrite or chain structure is of $\alpha\text{-}Fe_2O_3$.

11. The magnetic recording medium of claim 7, wherein the powder having a dendrite or chain structure is of $TiO_2$.

12. The magnetic recording medium of claim 7, wherein the carbon black contained in the back coating layer has an average primary-particle size of 20 to 150 mμ.

13. A magnetic recording medium of claim 7, wherein the non-magnetic inorganic powder is present in an amount of 3 to 15% by weight based on the magnetic powder.

* * * * *